(12) United States Patent
Hitchins

(10) Patent No.: US 11,620,252 B2
(45) Date of Patent: Apr. 4, 2023

(54) SYSTEM FOR RECORDED E-BOOK DIGITAL CONTENT PLAYOUT

(71) Applicant: THE UTREE GROUP PTY LTD, Lane Cove (AU)

(72) Inventor: Salleeanne Hitchins, Lane Cove (AU)

(73) Assignee: THE UTREE GROUP PTY LTD, Lane Cove (AU)

( * ) Notice: Subject to any disclaimer, the term of this patent is extended or adjusted under 35 U.S.C. 154(b) by 62 days.

(21) Appl. No.: 16/969,158

(22) PCT Filed: Feb. 12, 2019

(86) PCT No.: PCT/AU2019/050106
§ 371 (c)(1),
(2) Date: Aug. 11, 2020

(87) PCT Pub. No.: WO2019/153053
PCT Pub. Date: Aug. 15, 2019

(65) Prior Publication Data
US 2021/0042258 A1    Feb. 11, 2021

(30) Foreign Application Priority Data
Feb. 12, 2018 (AU) ............................... 2018900429

(51) Int. Cl.
*G06F 15/00* (2006.01)
*G06F 15/02* (2006.01)
(Continued)

(52) U.S. Cl.
CPC .......... *G06F 15/0291* (2013.01); *G06F 3/013* (2013.01); *G10L 15/26* (2013.01);
(Continued)

(58) Field of Classification Search
CPC .................................................. G06F 15/0291
See application file for complete search history.

(56) References Cited

U.S. PATENT DOCUMENTS 6,745,163 B1   6/2004   Brocious et al.
8,484,027 B1   7/2013   Murphy
(Continued)

OTHER PUBLICATIONS

International Search Report dated May 20, 2019 from PCT Application No. PCT/2019/050106.

Primary Examiner — Kesha Frisby
(74) Attorney, Agent, or Firm — Innovation Capital Law Group, LLP; Vic Lin

(57) ABSTRACT

A system allows for audio playout of e-book content data using a playout electronic device recorded by a remote recording electronic device. The system may analyse the e-book content to infer XY on-screen display coordinates for each word of the e-book and speech recognition may correlate the timing of the spoken words to the XY coordinates. As such, a read along display animation may be generated by the digital display of the playout electronic device in time with the audio and the respective on-screen position of each word. Eye tracking may be employed by the playout electronic device for the display of a gaze position indicator to the recording electronic device in substantial real-time. The system may further employ machine learning to optimise a trained machine to output at least one prosodic features for user profile specific speech emulation using a speech emulator.

17 Claims, 6 Drawing Sheets

(51) Int. Cl.
  *G06F 3/01*  (2006.01)
  *G10L 15/26*  (2006.01)
  *G10L 21/10*  (2013.01)
  *G06N 20/00*  (2019.01)
  *G06F 16/44*  (2019.01)

(52) U.S. Cl.
  CPC .............. *G10L 21/10* (2013.01); *G06F 16/44* (2019.01); *G06N 20/00* (2019.01)

(56) References Cited

U.S. PATENT DOCUMENTS

| | | |
|---|---|---|
| 8,862,255 B2 | 10/2014 | Story et al. |
| 9,335,819 B1 | 5/2016 | Jaeger et al. |
| 2017/0300200 A1 | 10/2017 | Chak et al. |

SYSTEM FOR RECORDED E-BOOK DIGITAL CONTENT PLAYOUT

FIELD OF THE INVENTION

This invention relates generally to a system for recorded e-book digital content playout and display synchronisation and, in embodiments, user interface interactivity therewith and user-specific speech emulation.

SUMMARY OF THE DISCLOSURE

There is provided herein a system for playout of e-book digital content on remote electronic devices.

In accordance with a first embodiment, the present system is configured for user interface animation synchronised with remotely recorded digital content. The system may be configured for analysing e-book content to infer XY on-screen display coordinates for each word of the e-book. In one embodiment, such analysis comprises performing optical character recognition (OCR) on e-book content data so as to determine XY on-screen display coordinates for each word of an e-book. The system may emulate at least one of aspect ratio, display resolution and orientation of a digital display so as to calculate the XY on-screen display coordinates correctly for each type of display device screen.

Furthermore, when recording audio data utilising the recording electronic device, the system may be configured for performing speech recognition to correlate the words spoken by the first user and the XY on-screen display coordinates of the corresponding words of the e-book to generate animation playout timing meta data. In this way, the system is able to generate animation playout meta data according to the XY on-screen display coordinates and speech position correlation such that, when displaying the e-book content on the playout electronic device, each word is able to be animated with an animation in time with the reading at both the position of each relevant word and in time with the played out audio data.

The present methodology provides a way for robust, relatively accurate and user-friendly manner for animation authoring of a large number of e-books from an e-book content database, including e-books of differing formats. As such, the present system is able to utilise existing e-book content databases without requiring modification thereof including for various screen aspect ratios, display resolutions and orientations.

Furthermore, the use of speech recognition correlation with reference to each known word of the e-book provides a relatively accurate manner for the generating the animation playout timing meta data especially for suboptimal audio environments. Specifically, the present speech recognition correlation is able to achieve higher levels of accuracy as opposed to, for example, conventional speech recognition, in that the present speech recognition correlation is able to utilise not only each of the known words of each page of the e-book, but also the known sequence so as to accurately generate the speech timing meta data for the subsequent animation thereof.

In embodiments, and especially for simultaneous reading, the playout electronic device is able to transmit user interface interactivity in real time user between electronic display devices. In one embodiment, the playout electronic device comprises an eye tracking controller operably coupled to an image capture device thereof which detects an XY gaze position coordinate of the second user by image analysis of facial features captured by the image capture device. These XY gaze position coordinates may be transmitted to the recorder playout device such that a corresponding gaze position indicator may be displayed thereon.

In further embodiments, the system is configured for accurate user-specific speech emulation allowing for accurate mimicking of a user's reading style, thereby allowing for automated reading of unread books or alternatively reading even when a user is no longer available.

In accordance with this embodiment, the system comprises a machine learning module having as input training data comprising historical audio data in relation to at least one user profile. The machine learning module is configured for optimising a trained machine (such as an artificial neural network) such that the trained machine, having as input other e-book content data is able to output at least one prosodic feature for user profile specific speech emulation using a speech emulator.

The prosodic feature may be pitch, loudness, tempo, rhythm, intonation and stress for example.

Furthermore, the at least one prosodic feature is specific to at least one of a word and word group of the words such a user speech may be mimicked in context.

It should be noted that whereas audio content is described herein predominantly with reference to a preferred embodiment, it should be noted that the present system may be adapted for also transmitting recorded video or image data in embodiments, including video or image data captured by an image capture device of one of the each electronic devices and video or image data which is dynamically generated in accordance with user interactions with the system.

As such, with the foregoing in mind, in accordance with one aspect, there is provided a system for e-book content recorded audio playout word animation, the system comprising: a recording electronic device in operable communication with a playout electronic device across a wide area network, wherein the system is configured to: receive e-book content data from an e-book content database; analyse the e-book content data to calculate XY on-screen display coordinates for words of the e-book content data; when displaying the e-book content data on a digital display of the recording electronic device, receive spoken word audio data from a microphone of the recording electronic device; perform speech recognition correlation to correlate the spoken word audio data with the words of the e-book content data to generate animation playout timing meta data; and play out the audio data via an audio output device of the playout electronic device while simultaneously displaying the words along with a reading timing animation in accordance with the XY on-screen display coordinates and animation playout timing meta data using a digital display of the playout electronic device.

Analysing the e-book content data to calculate the XY on-screen display coordinates may comprise optical character recognition.

Calculating the XY on-screen display coordinates may comprise using a renderer controller to emulate at least one of an aspect ratio, display resolution and display orientation of a digital display to calculate the XY on-screen display coordinates relative thereto.

The e-book content database may comprise e-books of differing e-book file formats and wherein the renderer controller may be configured for rendering differing e-book file formats.

When displaying the e-book content data on the digital display of the recording electronic device, the system may be further configured for receiving graphic animation haptic input and generating graphic animation meta data accordingly.

When playing out the audio data, the playout electronic device may be further configured for generating a graphic animation according to the graphic animation meta data.

the graphic animation may comprise at least one of positional adjustment, size adjustment and highlighting animation.

When receiving the graphic animation haptic input, the system may be further configured for receiving a graphic animation type selection such that, when generating the graphic animation, the playout electronic device may be configured for displaying the selected graphic animation type selection.

When performing the speech recognition correlation, the system may be configured for detecting an end of page position such that the recording electronic device may be able to perform an automatic page turn animation.

The playout electronic device may be configured for receiving a position adjustment haptic user input and wherein the system may be configured for tracking to a specific playout position of the audio data accordingly.

The position adjustment haptic input may comprise a reading rate animation haptic adjustment.

The position adjustment haptic input may comprise a page position haptic adjustment.

At least one of the recording and playout electronic devices may comprise an image capture device for the transmission of at least one of image and video data between the electronic devices for display at least one of adjacent or overlaid the e-book content data.

The playout electronic device may comprise an image capture device and a gaze position detector controller operably coupled thereto configured for detecting a gaze position relative to the digital display thereof and wherein the system may be configured for transmitting the gaze position to the recording electronic device and wherein the recording electronic device may be configured for generating an on-screen gaze position indicator accordingly.

The playout electronic device may be configured for detecting haptic gestures using a haptic overlay and transmitting haptic position data to the recording electronic device and wherein the recording electronic device may be configured for generating an on-screen haptic position indicator accordingly.

The system further may comprise a machine learning module having as input training data comprising historical audio data in relation to at least one user profile, the machine learning module configured for optimising a trained machine such that the trained machine, having as input e-book content data, outputs at least one prosodic feature for user profile specific speech emulation using a speech emulator.

The prosodic features may comprise at least one of pitch, loudness, tempo, rhythm, intonation and stress.

The at least one prosodic feature may be specific to at least one of a word and word group of the words.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
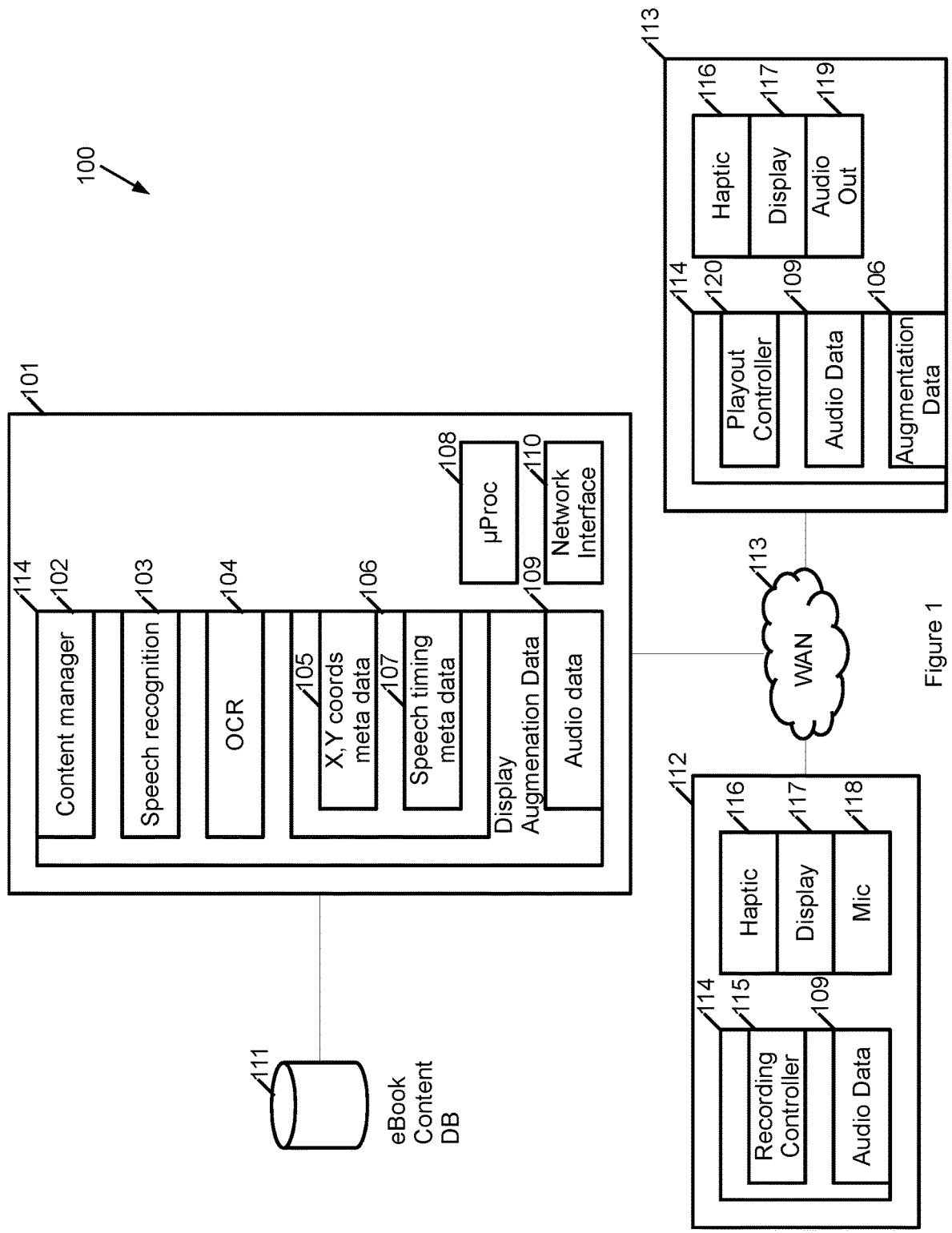
FIG. 1 shows a system for e-book content recorded audio playout word animation in accordance with an embodiment.

FIG. 1 shows a system 100 for e-book content recorded audio playout word animation. In the embodiment shown, the system 100 comprises a server 101. The system 100 may further comprise a recording electronic device 112 in operable communication with the web server 101 across a wide area network 113, such as the Internet. The system further comprises a playout electronic device 113 similarly in operable communication with the server 101 across a wide area network 113.

As will be described in further detail below, the system 100 is configured for animation playout meta data authoring utilising the recording electronic device 112 such that e-book content displayed by the playout electronic device 113 is able to be animated in time with recorded audio.

Each electronic device 112, 113 and the server 101 comprises a microprocessor 108 for processing digital data. In operable communication with the processor 108 across a system bus is a memory device 114. The memory device 114 is configured for storing digital data, including computer program code instructions and associated data. As such, in use, these computer program code instructions are fetched by the microprocessor 108 for interpretation and execution. Various computer program code controllers and associated data are shown in FIG. 1 and will be described in further detail below.

The server 101 is in operable communication with at least one e-book content database 111. The database 111 may comprise many thousands of digital e-books, including in differing formats, including PDF, EPUB, AZW and the like.

The server 101 may comprise a content manager controller 102 for managing e-book content titles, including allowing for the indexing, display and user selections thereof.

A first user, utilising the recording electronic device 112 is able to browse the e-book titles via the web server 101 and make a selection of a particular e-book for audio animation authoring in the manner described herein.

Figure 2:
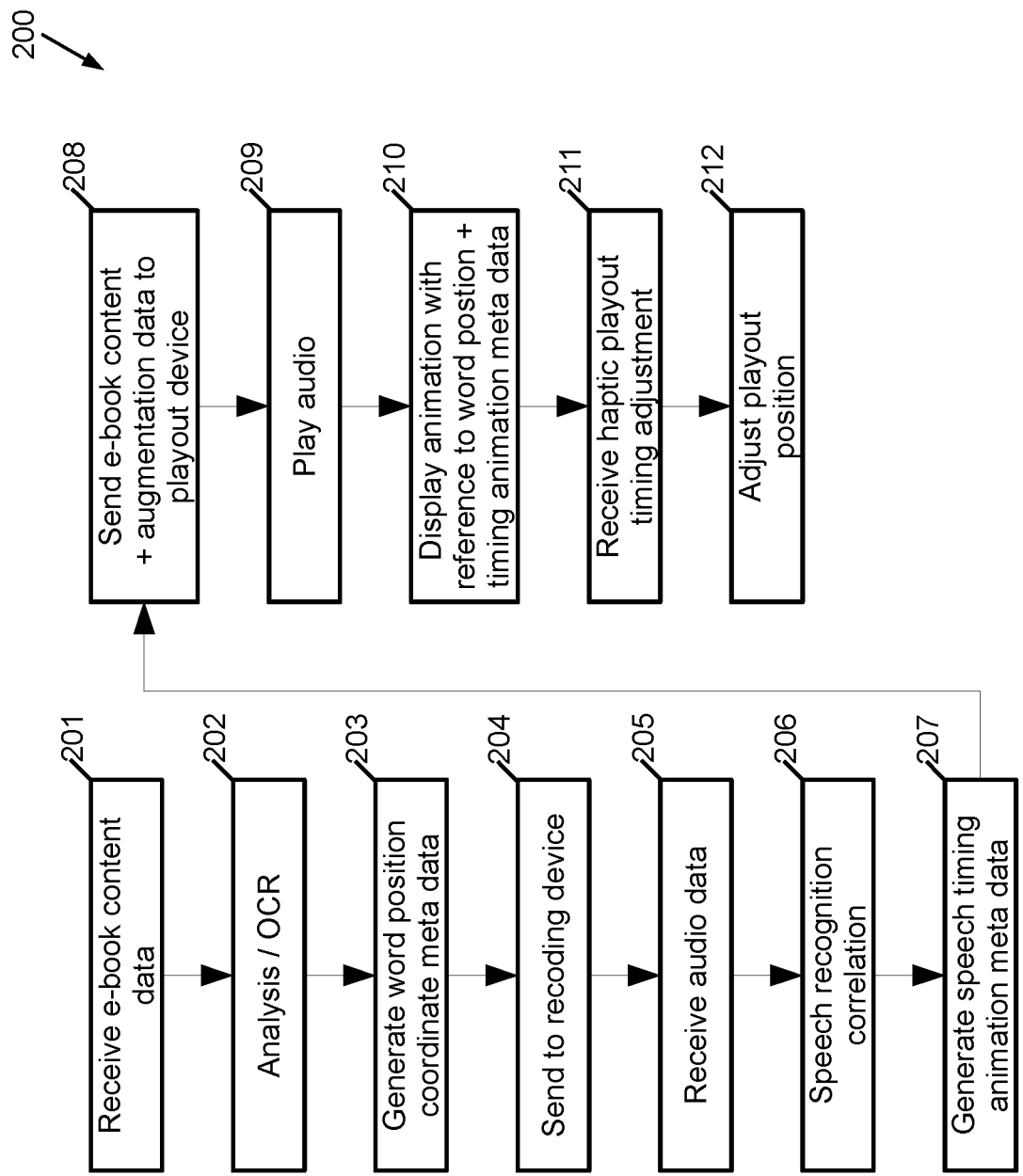
FIG. 2 shows exemplary processing of the system of FIG. 1 in accordance with an embodiment.

Reference will now be further made to the exemplary processing 200 of the system 100 as is substantially shown in FIG. 2.

Having selected the e-book, the server 101 is configured for retrieving the e-book content from the e-book content database 111 at step 201.

Having retrieved the e-book content, the system 100 may perform analysis of the e-book content at step 202 to generate XY on-screen display coordinate meta data for each word at step 203. In embodiments, the on-screen XY coordinates may be inferred from the markup of the e-book data. In alternative embodiments, and especially for page imagery, OCR may be performed to generate the XY on-screen display coordinates.

As is shown in FIG. 1, the server 101 may comprise an OCR controller 104 for such.

The OCR controller 104 is configured for determining on-screen XY display coordinate meta data for each word of each page of the selected e-book.

In this regard, the server 101 may comprise rendering controllers for simulating the rendering of the e-book content for each of the e-book file format types. Furthermore, the renderers may be configured for rendering utilising different screen aspect ratios, display resolutions and orientations of differing electronic devices. For example, the renderer controller may be configured for rendering using screen aspects of commonly available display devices.

Figure 4:
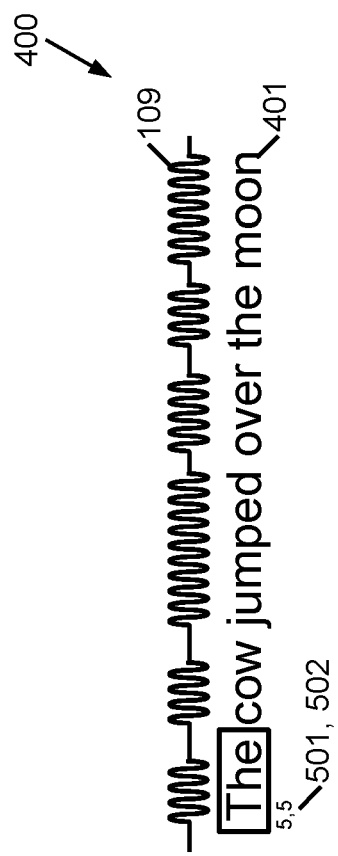
FIG. 4 shows exemplary speech recognition correlation in accordance with an embodiment.
Figure 5:
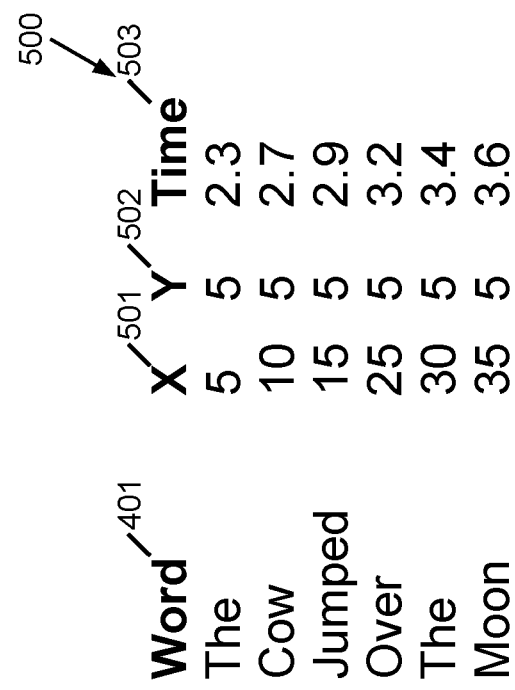
FIG. 5 shows exemplary display augmentation data comprising both XY on-screen display coordinate meta data and speech timing meta data generated for the exemplary sentence of FIG. 4 in accordance with an embodiment of the present invention.

As is shown in FIG. 4, for a sentence of a plurality of words 401, the renderer controller is configured for generating XY on-screen display coordinates 105 for each word. As is shown in FIG. 4, the word "the" has on-screen display coordinates 105 having an X coordinate 501 of 5 pixels and a Y coordinate 502 of 5 pixels.

In this way, XY on-screen display coordinates may be calculated utilising the OCR controller 104 for each of the words 401 of the sentence. These XY on-screen display coordinates are stored as part of display augmentation data 106 within the memory 114 of the server 101.

The renderer controller may be used to calculate the XY on-screen display coordinates 105 for a plurality of different types of electronic display devices simultaneously such that, during playout, the appropriate set of XY on-screen display coordinates 105 may be selected accordingly.

At step 204, the e-book content is sent to the recorder electronic device 112.

Each electronic device 112, 113 comprises a digital display 117 for the display of digital data. A haptic interface 116 may be overlaid the digital display 117 for the receipt of user gestures with reference to the display digital data.

As such, the e-book content is displayed by the digital display 117 on the recording electronic device.

The recorder electronic device 112 comprises a recording controller 115 within memory 114. The recording controller 115 is configured for recording audio data 109 of the displayed e-book content utilising microphone 118. Specifically, for each page of the e-book displayed by the display device 117, the first user records himself or herself reading the displayed words of the e-book content.

At step 205, the server 101 receives the recorded audio data 109 from the recording electronic device 112.

At step 206, the system 100 may be configured for performing speech recognition correlation utilising the recorded audio data 109 and the words of the e-book to generate speech timing animation meta data 107 at step 207.

FIG. 4 shows the recorded audio data 109 comprising a plurality of spoken word audio data sections corresponding to each word. As such, for each word 401, the system is configured to calculate playout animation timing meta data 107.

As can be seen, for the word "the", the playout timing has been calculated as 2.3 seconds, whereas for the word "cow", the playout timing has been calculated as 2.7 seconds and so on and so forth.

The speech timing meta data 107 similarly stored within the memory 114 of the server 101 as part of the display augmentation data 106.

The speech recognition correlation may be utilised for automatic page turning of the e-book displayed by the recording electronic device 112.

In substantial real time, or at a later time, the e-book content, audio data 109 and display animation data 106 are sent to the playout electronic device 113. In an alternative embodiment, the speech recognition correlation may be performed by the playout device 113 in substantial real-time.

The playout electronic device 113 further comprises a digital display 117 associated haptic overlay 116. Furthermore, the playout electronic device 113 further comprises an audio output device 119 for the playout of the audio data.

The audio data 109 and the display augmentation data 106 received from the server 101 may be stored within the memory 114 of the playout electronic device 113.

Furthermore, the playout electronic device 113 may be configured with a playout controller 120 configured for the display of the e-book content data at step 209 while simultaneously displaying reading timing animations at step 210.

Figure 3:
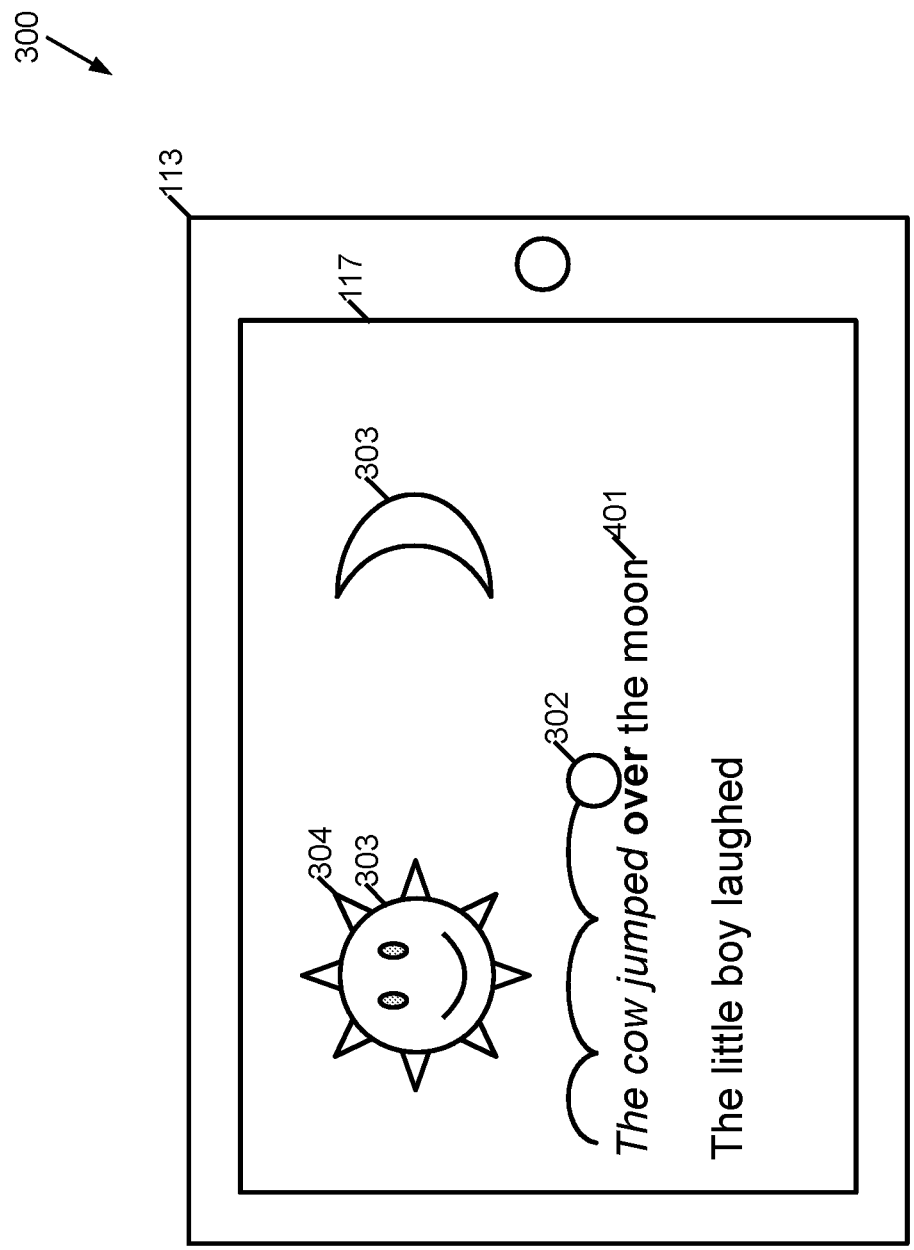
FIG. 3 shows an exemplary interface displayed by a playout electronic device of the system of FIG. 1 in accordance with an embodiment.

FIG. 3 shows an exemplary interface 300 displayed by the digital display 117 of the playout electronic device 300.

As can be seen, the interface 300 displays the words 401 of the e-book. Associated graphics 303 may simultaneously be displayed also.

In the embodiment shown, the reading timing animation takes the form of a bouncing ball 302 however other reading timing animations are envisaged also.

As such, as the audio data 109 is played out via the audio output device 119, the reading timing animation 302 is displayed in relation to the words 401 according to the XY on-screen display coordinate meta data 105 and in time/synchronously with the audio data according to the speed timing meta data 107.

Upon completion of the animation of the words of a page, the interface 300 may comprise a page turn animation to move to the next page of the e-book.

In embodiments, the second user may adjust the playout timing, such as by way of a haptic player timing adjustment at step 211. For example, the second user may drag-and-drop the playout animation 302 or move the displayed page position forwards and backwards.

As such, at step 212, the system 100 is configured for adjusting the playout position 212 and seeking to the appropriate timing position within the audio data 109.

In embodiments, in addition to word reading timing animation display, the system 100 is configured for performing graphic animation.

Specifically, for the examiner interface 300 is shown in FIG. 3, the displayed page comprises "boy face" and "moon" graphics 303.

When recording the audio data, the first user may utilise on-screen haptic gestures to select various of the displayed graphics 303. For example, when reading the word 401 relating to the boy, the first user may tap the associated boy face graphic. As such, the system 100 is further configured for generating graphic animation meta data as part of the display augmentation data 106. The system 100 may either recognise graphics using e-book content markup or alternatively an image recognition technique.

As such, at the relevant playout position, the playout electronic device 113 may be configured for correspondingly animating the boy face graphic as a substantially shown in FIG. 3.

Differing animations may be performed, including highlighting, moving, size adjustment and the like. In embodiments, the first user may select the animation to perform from a set of available animations.

It should be noted that the various computer processing described herein may be performed by differing computing devices of FIG. 1 in embodiments. For example, one of the electronic devices 112 may perform the OCR, or speech recognition correlation.

Figure 6:
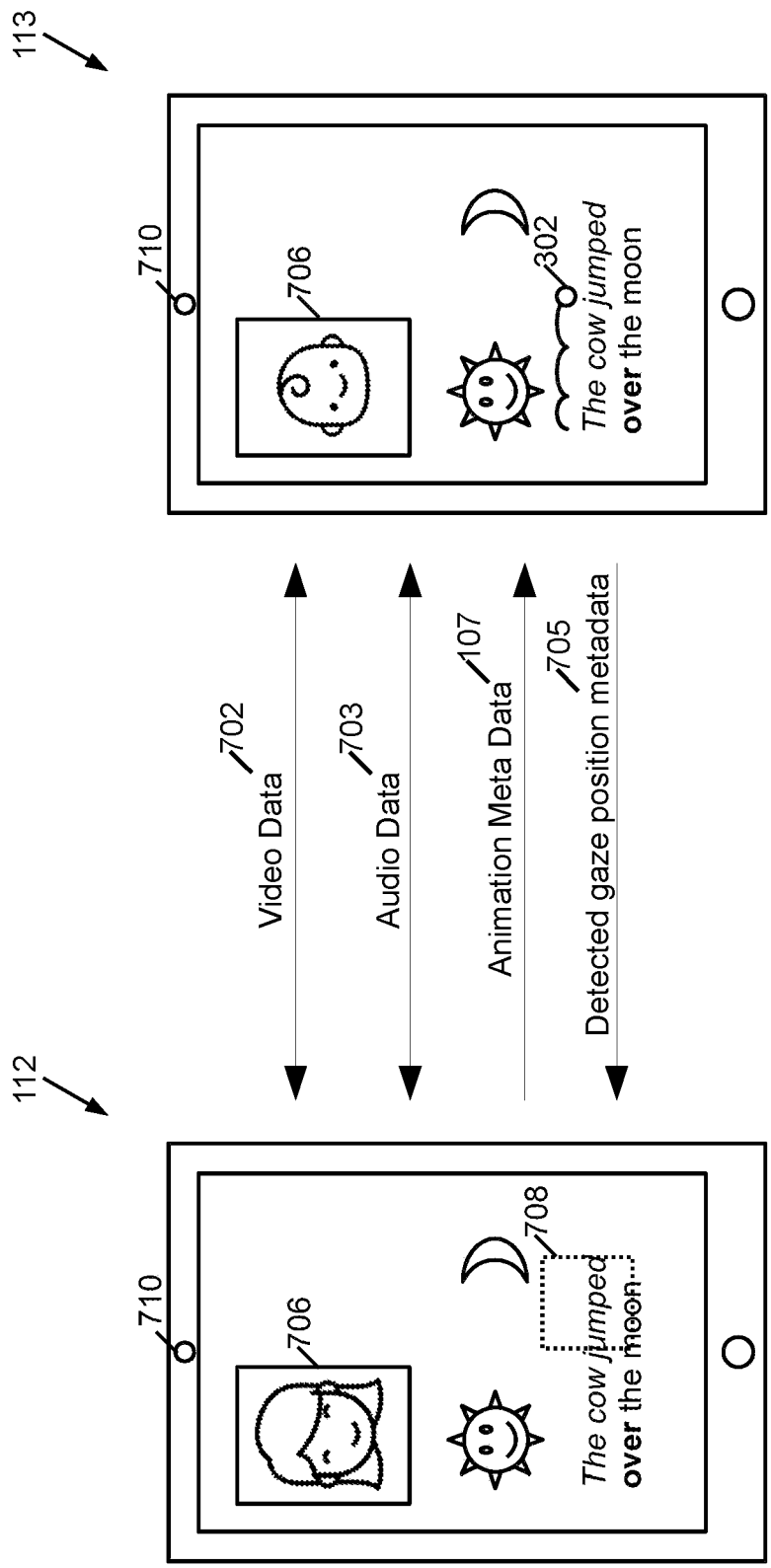
FIG. 6 illustrates data transmissions between the electronic devices, including detect gaze position meta data in accordance with an embodiment.

FIG. 6 illustrates an embodiment wherein at least one of the electronic devices 112, 113 comprises an image capture device 710 orientated to capture facial images of each respective user.

Image or video data 702 of such facial images may be transmitted between the electronic devices 112, 113, such that each user may view a facial image of the corresponding user. In this embodiment, the first user may view the facial image of the second user remotely and vice versa. In alternative embodiments, video data is transmitted only from one device 112, 113 to the other such that only facial image or video data of the first user using the recording electronic device 112 is transmitted to the second user using the playout electronic device 710 or vice versa.

As is shown in FIG. 6, the facial image or video 706 may be displayed adjacent or overlaid the e-book content.

The recording electronic device 112 may transmit the speech timing animation meta data 107 to the playout electronic device 113 for the display of the reading timing animation 302.

However, the playout electronic device 113 may comprise an eye tracking controller which performs image analysis in any one of the manners known in the art on the image data received via the image capture device 710 thereof so as to ascertain the relative position of the respective users gaze on the digital display 117.

The playout electronic device 113 may transmit detected gaze position meta data 705 to the recording electronic device 112 such that a gaze position indication 708 may be displayed on the electronic display 117 thereof. The gaze position indication 708 may inform the first user as to the attention of the second user when reading along together. In this way, the user may read the words when the gaze position indicator 708 indicates that the recipient is following the words along but may pause reading if the second user's gaze is elsewhere indicative of the second user being distracted.

In alternative embodiments, the playout electronic device 113 may record audio data via a microphone device thereof so as to perform speech recognition on the audio data. The speech recognition may correlate a spoken word within on-screen displayed word so as to be able to transmit to the recording electronic device 112 the position of the correlated word. In this way, the second user may read together with the first user wherein a readout position indicator may be indicated to the first user.

In further embodiments, the haptic overlay 116 of the electronic display device 117 of the playout electronic device 113 may receive touch gestures thereon whilst the second user follows the wording with a finger across the display 117. The XY coordinates of the touch position of the screen may be transmitted to the recorder electronic device 112 to similarly display a touch display position indicator 708 so as to indicate to the reader as to the current following position of the second user.

Figure 7:
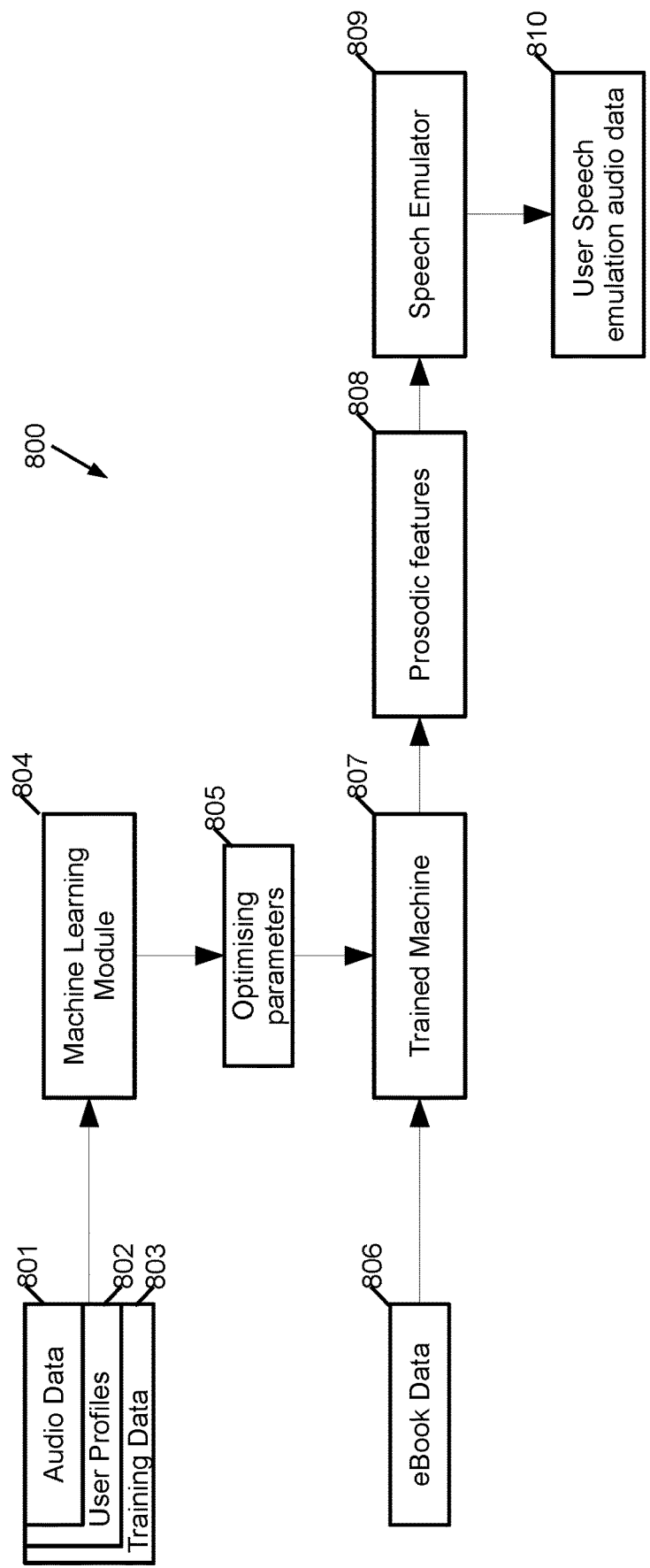
FIG. 7 shows machine learning for user profile specific speech emulation in accordance with an embodiment.

FIG. 7 shows an embodiment wherein the system 100 employs machine learning 800 for user-specific speech emulation.

Specifically, the machine learning 800 comprises a machine learning module 804 which trains using training data 803 comprising historical audio data 801 in respect of a plurality of user profiles 802.

The machine learning module 802 trains using the training data 803 and generates optimising parameters 805 which optimise the trained machine 807. The trained machine 807 may take the form of an artificial neural network (ANN) such that the optimising parameters 805 are neuron weightings thereof.

The trained machine 807 has as input e-book content data 806 and outputs prosodic features 808 used by a speech emulator 809 to generate a user specific audio data.

The prosodic features 808 may represent user specific features of pitch, loudness, tempo, rhythm, intonation and stress.

The prosodic features 808 may be recognised by the machine learning module 804 as being specific to words or word groups/sentences such that the speech emulator is able to emulate the first user contextually. As such, the trained machine 807 may apply differing prosodic features 808 for differing words or sentence groups or for similar words or similar sentence groups.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for e-book content recorded audio playout word animation, the system comprising:
 a recording electronic device in operable communication with a playout electronic device across a wide area network, wherein the system is configured to:
 receive e-book content data from an e-book content database;
 analyse the e-book content data to calculate XY on-screen display coordinates for each word of the words of the e-book content data;
 when displaying the e-book content data on a digital display of the recording electronic device, receive spoken word audio data from a microphone of the recording electronic device;
 perform speech recognition correlation to correlate the spoken word audio data with each word of the e-book content data to generate animation playout timing meta data; and
 play out the audio data via an audio output device of the playout electronic device while simultaneously displaying the words along with a reading timing animation for each word in accordance with the XY on-screen display coordinates and animation playout timing meta data using a digital display of the playout electronic device,
 wherein calculating the XY on-screen display coordinates comprises the system using a renderer controller to emulate at least one of an aspect ratio, display resolution and display orientation of a digital display of differing electronic devices for the selection of the XY on-screen display coordinates therefrom.

2. A system as claimed in claim 1, wherein analysing the e-book content data to calculate the XY on-screen display coordinates comprises optical character recognition.

3. A system as claimed in claim 1, wherein the e-book content database comprises e-books of differing e-book file formats and wherein the renderer controller is configured for rendering differing e-book file formats.

4. A system as claimed in claim 1, wherein, when displaying the e-book content data on the digital display of the recording electronic device, the system is further configured for receiving graphic animation haptic input and generating graphic animation meta data accordingly.

5. A system as claimed in claim 4, wherein, when playing out the audio data, the playout electronic device is further configured for generating a graphic animation according to the graphic animation meta data.

6. A system as claimed in claim 4, wherein the graphic animation comprises at least one of positional adjustment, size adjustment and highlighting animation.

7. A system as claimed in claim 6, wherein, when receiving the graphic animation haptic input, the system is further configured for receiving a graphic animation type selection such that, when generating the graphic animation, the playout electronic device is configured for displaying the selected graphic animation type selection.

8. A system as claimed in claim 1, wherein, when performing the speech recognition correlation, the system is configured for detecting an end of page position such that the recording electronic device is able to perform an automatic page turn animation.

9. A system as claimed in claim 1, wherein, the playout electronic device is configured for receiving a position adjustment haptic user input and wherein the system is configured for tracking to a specific playout position of the audio data accordingly.

10. A system as claimed in claim 9, wherein the position adjustment haptic input comprises a reading rate animation haptic adjustment.

11. A system as claimed in claim 9, wherein the position adjustment haptic input comprises a page position haptic adjustment.

12. A system as claimed in claim 1, wherein at least one of the recording and playout electronic devices comprises an image capture device for the transmission of at least one of image and video data between the electronic devices for display at least one of adjacent or overlaid the e-book content data.

13. A system as claimed in claim 1, wherein the playout electronic device comprises an image capture device and a gaze position detector controller operably coupled thereto configured for detecting a gaze position relative to the digital display thereof and wherein the system is configured for transmitting the gaze position to the recording electronic device and wherein the recording electronic device is configured for generating an on-screen gaze position indicator accordingly.

14. A system as claimed in claim 1, wherein the playout electronic device is configured for detecting haptic gestures using a haptic overlay and transmitting haptic position data to the recording electronic device and wherein the recording electronic device is configured for generating an on-screen haptic position indicator accordingly.

15. A system as claimed in claim 1, wherein the system further comprises a machine learning module having as input training data comprising historical audio data in relation to at least one user profile, the machine learning module configured for optimising a trained machine such that the trained machine, having as input e-book content data, outputs at least one prosodic feature for user profile specific speech emulation using a speech emulator.

16. A system as claimed in claim 15, wherein the prosodic features comprise at least one of pitch, loudness, tempo, rhythm, intonation and stress.

17. A system as claimed in claim 16, wherein the at least one prosodic feature is specific to at least one of a word and word group of the words.

* * * * *